J. M. JOHNSON.

RAIL JOINT.

APPLICATION FILED JAN. 27, 1913.

Reissued Mar. 24, 1914. 13,703.

Witnesses

T. L. Moscrop

Emory L. Groff.

Inventor

Joseph M. Johnson,

By S. P. Wolhampter, his Attorney

COLUMBIA PLANOGRAPH CO., WASHINGTON, D. C.

UNITED STATES PATENT OFFICE.

JOSEPH M. JOHNSON, OF MILLERSBURG, PENNSYLVANIA, ASSIGNOR TO THE RAIL JOINT COMPANY, A CORPORATION OF NEW YORK.

RAIL-JOINT.

13,703. Specification of Reissued Letters Patent. Reissued Mar. 24, 1914.

Original No. 993,830, dated May 30, 1911, Serial No. 599,566. Application for reissue filed January 27, 1913. Serial No. 744,597.

*To all whom it may concern:*

Be it known that I, JOSEPH M. JOHNSON, a citizen of the United States, residing at Millersburg, in the county of Dauphin and State of Pennsylvania, have invented certain new and useful Improvements in Rail-Joints, of which the following is a specification.

This invention relates to new and useful improvements in rail joints, and has for an object to provide a device of this character which will securely clamp the meeting ends of a pair of rails in proper position, and also protect the connecting bolts against injury by the wheels of a car upon derailment of the same.

Another object of this invention is to improve and simplify devices of this character, rendering them comparatively simple and inexpensive to manufacture, reliable and efficient in use and readily assembled.

With the above and other objects in view, this invention resides in the novel features of construction, formations, combinations and arrangements of parts to be hereinafter more fully described, claimed and illustrated in the accompanying drawings, in which—

Figure 1:
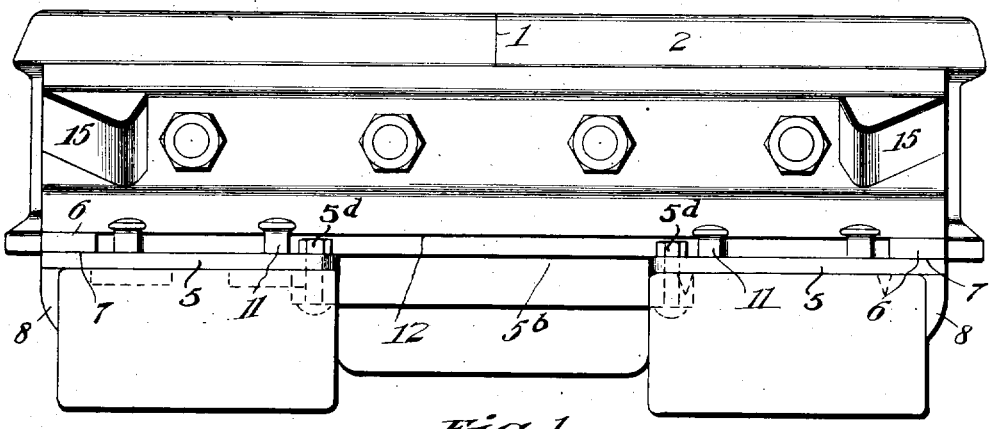
Figure 2:
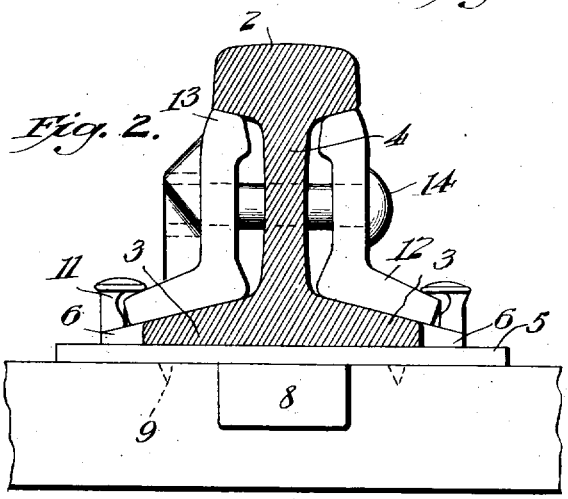
Figure 5:
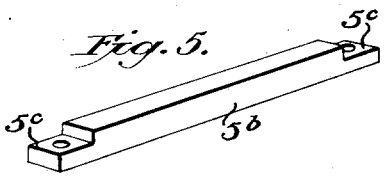
Figure 3:
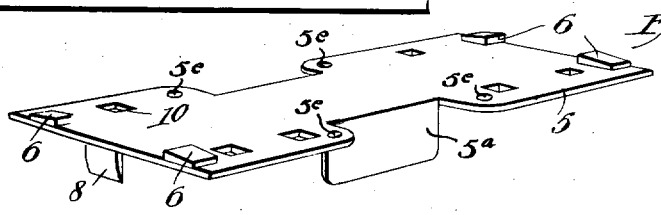
Figure 4:
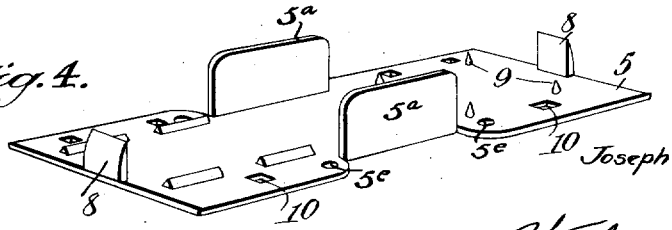

Figure 1 is a side elevation of my invention. Fig. 2 is a sectional view taken through one of the rails, showing my invention in end elevation. Figs. 3 and 4 are perspective views of the tie-engaging plate. Fig. 5 is a detail perspective view of one of the reinforcing members detached.

Referring to the drawings by characters of reference, the numeral 1 designates the meeting ends of a pair of rails or the like, comprising the customary heads 2, base flanges 3 and connecting webs 4, the said rail adapted to be mounted upon a suitable plate 5, provided at intervals throughout its length with upstanding bosses or extensions 6, adapted to engage cut-away portions 7 located in the base flanges of the rails, for the purpose of assisting in holding the rails against displacement upon the ties. This plate 5 is also provided with depending extensions 8, adapted to engage one face of the tie, and with downwardly projecting pins 9, adapted to be driven into the tie for the purpose of holding the plate against displacement therewith.

Apertures 10 are located in the plate 5, upon opposite sides of the base flanges of the rails in staggered relation to each other, to provide a means whereby the customary rail-retaining spikes 11 may be driven into the ties, with their upper ends or heads engaging the base flanges 12 of the splicing angle bars or fish plates 13, secured to opposite sides of the rails by means of the customary bolts 14. The fish plates 13 are provided adjacent the outer retaining bolts 14 with horizontally arranged deflecting members 15, the said deflecting members serving to throw the wheels away from the bolts, manifestly protecting the same from injury by the wheels of the car in case of the derailment thereof. This desirable function of the deflecting members 15 is rendered possible, owing to the fact that the said members are in the form of approximately triangular shaped lugs which are laterally-offset from the outer side of the splice member or fish bar at the terminals thereof, the said lugs by reason of their triangular form necessarily presenting beveled sides which have an oblique disposition downward and inward toward the center of the joint, and which lugs by reason of this formation and disposition serve to positively deflect the derailed wheels off from the joint bolts, thus protecting the same from injury upon derailment of a car truck or trucks.

By reference particularly to Figs. 2 and 3 of the drawings, it will be observed that the rail supporting base plate 5 is provided upon opposite sides thereof, and intermediate its ends, with down-turned portions $5^a$ which form depending stiffening and reinforcing flanges that are arranged at the center of the joint and are disposed between the ties, thus materially contributing to the reinforcement of the joint at the center where such reinforcement is most needed. Also, as a part of the central reinforcement of the joint, within the vertical plane of the meeting ends of the rails, supplemental reinforcing members or bars $5^b$ may be arranged, as shown in Fig. 1 of the drawings, within the cut-away portions of the plate 5 where the depending flanges $5^a$ are located, said reinforcing members or bars $5^b$ having terminal attaching ears $5^c$ that are engaged by securing bolts $5^d$ that pass through the said ears and also through apertures $5^e$ which are provided in the base plate 5. The form of the reinforcing members or bars $5^b$ is shown in Fig. 5 of the drawings, and the arrangement thereof, as a part of the center reinforcement of the joint, is shown in the elevation of Fig. 1 of the drawings.

From the foregoing disclosure it will be manifest that a rail joint is provided which will fulfil all of the necessary requirements of such a device.

What I claim is:—

1. The combination with a pair of rail ends, of a plate, means carried by the plate for engaging said rail ends, means carried by the plate for engaging the ties of a railroad track, fish plates secured to the said rail ends, bolts projecting through the fish plates and the rail ends respectively, for holding said fish plates against displacement, and deflecting members formed upon the fish plates, substantially as and for the purposes hereinbefore described.

2. The combination with a pair of rail ends, of a plate, bosses formed upon the upper side of the said plate for engagement with recesses formed in the base flanges of the rail ends, depending extensions formed upon the lower face of the plate for engagement with the sides of the ties upon which the rails are to be located, depending pins formed upon the lower face of the plate for engagement with the said ties, fish plates upon opposite sides of the rail ends, bolts extending through the said fish plates and rail ends respectively, for holding the said fish plates against displacement, and deflecting extensions formed adjacent the end nut and bolts, for the purpose of preventing injury to the said bolts by deflecting the wheels of a car therefrom upon the derailment of the said car.

3. A rail joint including a joint bar having horizontally arranged wheel deflecting guards laterally offset from the outer side of its upright member at the terminals of the latter.

4. A rail joint including a joint bar provided at the end portions of its upright member with horizontally arranged and laterally offset guards having beveled faces arranged obliquely.

5. A rail joint including a joint bar provided at the end portions of its upright member with laterally-offset approximately triangular lugs arranged horizontally and presenting beveled surfaces to deflect derailed wheels from the joint bolts.

6. The combination with a pair of rail ends, of a plate, means carried by the plate for engaging said rail ends, means carried by the plate for engaging the ties of a railroad track, splicing angle bars secured to the rail ends, and spikes passing through the plate into the ties and having their heads engaging the flanges of the angle bars.

7. The combination with the ties and a pair of rail ends, of a rail-supporting base plate arranged upon the ties and having an interlocking engagement with the rail base flanges, said plate being provided with centrally arranged depending stiffening flanges, splice members, joint bolts connecting the splice members with the rail ends, and supplemental reinforcing bars disposed between the ties and fastened to the said base plate.

In testimony whereof I hereunto affix my signature in the presence of two witnesses.

JOSEPH M. JOHNSON.

Witnesses:

GEO. W. KLINE,
CLIFFORD KLINE.

Copies of this patent may be obtained for five cents each, by addressing the "Commissioner of Patents, Washington, D. C."